June 15, 1937. W. HARRIGAN 2,083,907
METHOD AND APPARATUS FOR REGULATING CARBURETOR MIXTURES
Filed Jan. 2, 1936
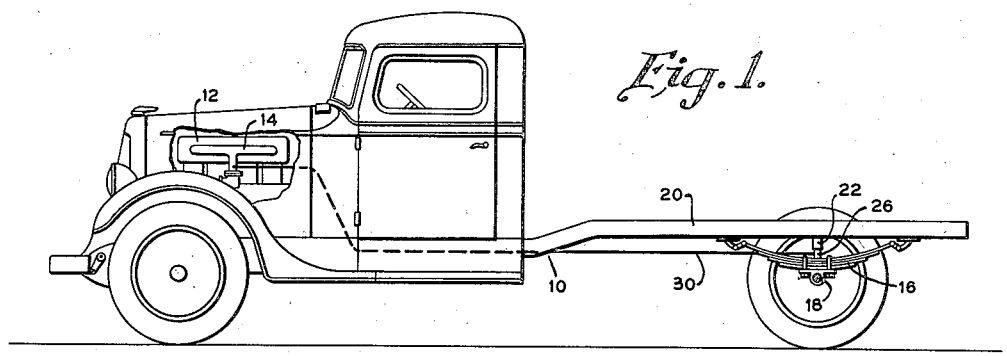
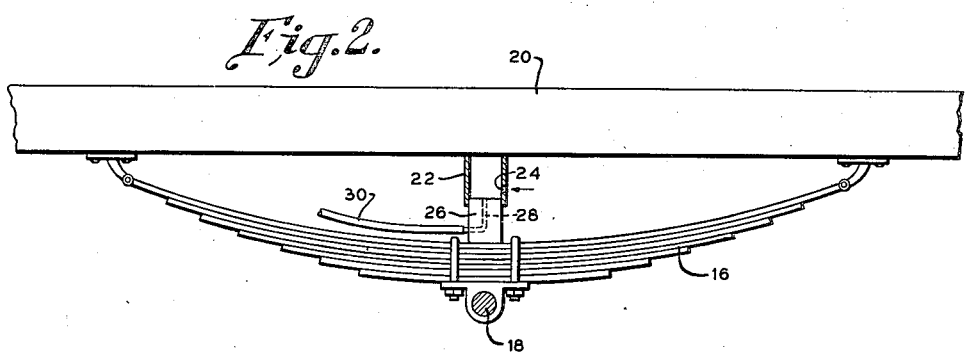
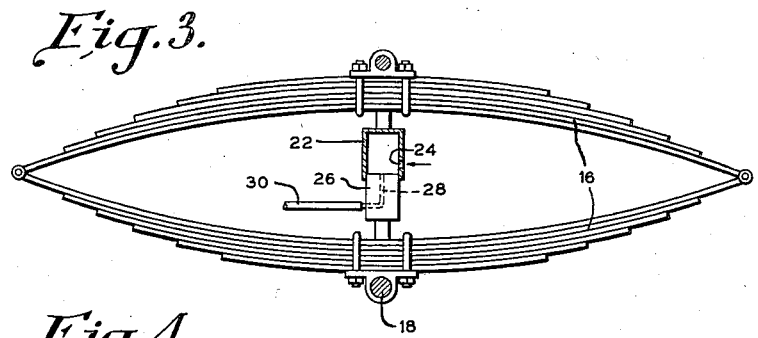
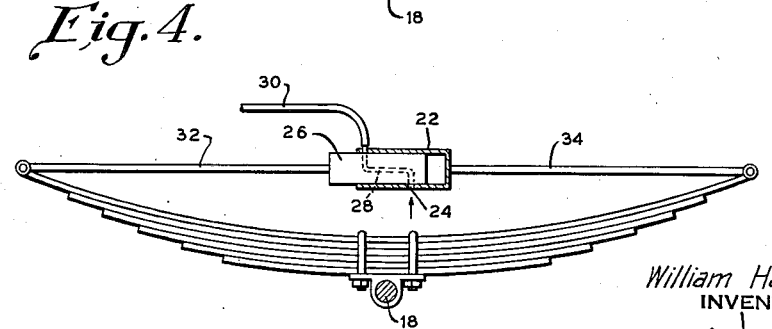
William Harrigan
INVENTOR
BY R. J. Dearborn
his ATTORNEY Patented June 15, 1937

2,083,907

UNITED STATES PATENT OFFICE 2,083,907

METHOD AND APPARATUS FOR REGULATING CARBURETOR MIXTURES

William Harrigan, Rutherford, N. J., assignor to The Texas Company, New York, N. Y., a corporation of Delaware Application January 2, 1936, Serial No. 57,320

4 Claims. (Cl. 180—82)

This invention relates to automotive vehicles powered with internal combustion engines, and more particularly to a method and apparatus for regulating the explosive mixtures in the carburetors of such engines in accordance with the weight of the loads carried by the vehicles.

It is an object of the present invention to provide an extremely simple yet efficient method and apparatus for automatically regulating the supply of air to the intake manifold of an automobile engine in order that the explosive mixture in the carburetor may be richened when heavy loads are being carried and thinned when the vehicle is running light.

A further object of the present invention is to provide an apparatus which is responsive to the action of a vehicle body on the springs for automatically regulating the supply of air to the intake manifold of an automobile in order to thin the carburetor mixture when the vehicle is carrying a light load.

Other objects, features and advantages of the invention will appear from the following description.

In the drawing:

Fig. 1 is a conventional drawing of a portion of an automotive vehicle equipped with an apparatus for regulating the supply of air to the carburetor.

Fig. 2 is an enlarged view of the elliptical spring assembly shown in Fig. 1 and showing in section an air valve which constitutes a part of the present invention.

Fig. 3 is an enlarged view of the same air valve shown in Figs. 1 and 2 assembled with a different type of spring assembly.

Fig. 4 is a view of an air valve assembled with a spring of the general type shown in Figs. 1 and 2.

In the drawing there is shown an automobile truck 10 of conventional form provided with an internal combustion engine 12 which has an air intake manifold 14. The truck 10 is provided with the usual elliptical rear springs 16 (only one of which is shown) which are secured to the axle 18 and yieldingly support the side rails 20 (only one of which is shown) of the truck body. A cylindrical valve housing 22 which is provided in its side wall with one or more restricted openings 24 in the nature of air inlet ports is suitably secured to the under side of one of the side rails 20 at a point above the center of one of the springs 16. A solid piston type valve 26 is suitably secured to the upper leaf of the spring 16 directly below the housing 22 and is of such a length as to extend a short distance into the housing 22 when no load is carried by the vehicle.

The valve 26 which is of a size to make a working fit in the housing 22 is bored to provide a duct 28 leading from the end which extends into the housing 22 to its side adjacent the opposite end. A flexible tube or pipe 30 of restricted diameter connects at one end with the end of the duct 28 in the side wall of the valve 26. Preferably the opposite end of the tube or pipe 30 extends to and connects with the intake manifold 14 of the vehicle but it may connect directly with the carburetor (not shown).

In the modified form of the invention shown in Fig. 3 the valve housing 22 and valve 26 are suitably supported between the sections of the double elliptical springs 16, 16, the housing 22 being secured to the upper section and the valve 26 to the lower section.

In the still further modified form of the invention shown in Fig. 4 the housing 22 and valve 26 are disposed horizontally and are separately supported by connecting links 32 and 34 which in turn are supported at their ends by being secured to one of the springs 16 in such a manner that the change in the relative position of the spring will provide the necessary movement of the air valve 26 so that when the spring is flexed, as when under heavy load, the air supply, by means of the valve 22, will be restricted or entirely stopped, and that when the vehicle load is reduced or removed air may enter the tube 30 connecting the air valve housing 22 and carburetor (not shown) or intake manifold 14 and by this means automatically correct the carburetion to conform with the load requirement of the vehicle.

For the most efficient and economical operation of a truck equipped with apparatus embodying the present invention the normal carburetor adjustment is preferably such as to provide a sufficiently rich mixture for the operation of the truck with a heavy pay load. A constant and uniform supply of the combustible fluid is fed to the carburetor. When the load carried by the truck has been delivered and the truck begins its return trip a leaner carburetor mixture will suffice to provide efficient operation. According to the present invention, when the truck is heavily loaded the body is forced downwardly by the weight of the load. As it moves downwardly against the action of the springs 16 the valve 26 is automatically forced into the valve housing 22 a sufficient distance to close or restrict the air inlet port or ports 24. Thus the supply of air to the air intake manifold 14 and carburetor is cut off or restricted. When the load is removed from the truck the body is moved upwardly by the action of the springs 16. This upward movement causes the valve 26 to be withdrawn from the valve housing 22 and as it is withdrawn the air inlet port or ports 24 are to some extent or entirely uncovered to allow air to enter the housing 22 from which it passes through the duct 28 and pipe 30 to the manifold 14 and ultimately to the carburetor. By varying the size, number and position of the air inlet ports 24 a very accurate regulation of the amount of air supplied to the carburetor can be obtained and the character of the explosive mixture may be varied by varying the amount of air mixed with a uniform amount of the combustible fluid. The amount of air so supplied is substantially inversely proportional to the weight of the load carried by the car. By thus thinning the explosive mixture in the carburetor of a car when rich mixtures are not required to move a heavy load substantial economies in operation can be effected by reducing the unnecessary consumption of the combustible fuel which is ordinarily gasoline.

Obviously, many modifications and variations of the invention, as hereinbefore set forth, may be made without departing from the spirit and scope thereof, and therefore only such limitations should be imposed as are indicated in the appended claims.

I claim:

1. In an automobile having an internal combustion engine and an intake manifold therefor, a pipe connecting with the manifold for admitting air thereto and a valve responsive to the weight of the load carried by the automobile for regulating the passage of air through said pipe to said intake manifold.

2. In an automotive vehicle having an internal combustion engine and springs supporting the rear end of the vehicle body on an axle, means for automatically regulating the admission of air to the engine comprising an air line communicating with the engine and a valve for controlling the passage of air through said air line responsive to the relative movement between one of said springs and the vehicle body for restricting the admission of air to said engine when said spring is flexed under a heavy load.

3. In an automobile having a spring supported body and an internal combustion engine, means for varying the explosive mixture supplied to said engine in accordance with the weight of the load carried by the body comprising a valve housing having an air inlet port in the wall thereof, a valve in said housing responsive to the relative movement between the body and springs of said automobile for regulating the admission of air to said housing, and means connecting said housing and said engine through which air from the housing passes to the engine for thinning the explosive mixture when the body is lightly loaded.

4. In the operation of an automobile, the method of regulating the explosive mixture which comprises maintaining a constant supply of combustible fuel to the engine, introducing air to the engine to mix with said combustible fuel and produce the explosive mixture therein, and automatically regulating the quantity of air supplied to said engine to mix with the constant supply of combustible fuel in accordance with the weight of the load carried by the automobile.

WILLIAM HARRIGAN.